United States Patent
Ahn et al.

(10) Patent No.: US 10,034,256 B2
(45) Date of Patent: Jul. 24, 2018

(54) WIRELESS DEVICE FOR WHICH PLURALITY OF SERVING CELLS IS CONFIGURED, AND COMMUNICATION METHOD USING SAME

(71) Applicant: LG ELECTRONICS INC., Seoul (KR)

(72) Inventors: Joonkui Ahn, Seoul (KR); Daesung Hwang, Seoul (KR); Seungmin Lee, Seoul (KR); Yunjung Yi, Seoul (KR); Dongyoun Seo, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 15/024,526

(22) PCT Filed: Aug. 11, 2014

(86) PCT No.: PCT/KR2014/007422
§ 371 (c)(1),
(2) Date: Mar. 24, 2016

(87) PCT Pub. No.: WO2015/046749
PCT Pub. Date: Apr. 2, 2015

(65) Prior Publication Data
US 2016/0219546 A1 Jul. 28, 2016

Related U.S. Application Data (60) Provisional application No. 61/883,187, filed on Sep. 26, 2013, provisional application No. 61/949,259, filed on Mar. 7, 2014.

(51) Int. Cl.
*H04L 1/00* (2006.01)
*H04W 56/00* (2009.01)
(Continued)

(52) U.S. Cl.
CPC ....... *H04W 56/0015* (2013.01); *H04L 1/1812* (2013.01); *H04L 1/1854* (2013.01);
(Continued)

(58) Field of Classification Search
CPC .. H04J 11/00; H04J 13/004; H04J 2011/0003; H04J 2011/0006;
(Continued)

(56) References Cited

U.S. PATENT DOCUMENTS

2015/0003302 A1\* 1/2015 Ekpenyong ........... H04W 72/14
370/280
2016/0021655 A1 1/2016 Seo et al.

FOREIGN PATENT DOCUMENTS

WO  WO 2013/125860 A1  8/2013

OTHER PUBLICATIONS

Etri, "Discussion on FDD-TDD joint operation solutions", R1-133184, 3GPP TSG RAN WG1 Meeting #74, Barcelona, Spain, Aug. 19-23, 2013, pp. 1-7, Figures 2-4. http://www.3gpp.org/ftp/tsg_ran/WG1_RL1/TSGR1_74/Docs/R1-133184.zip.
(Continued)

*Primary Examiner* — Dady Chery
(74) *Attorney, Agent, or Firm* — Birch, Stewart, Kolasch & Birch, LLP (57) ABSTRACT

Provided is a communication method by a wireless device for which a plurality of serving cells is configured in a wireless communication system. The wireless device configures a frequency division duplex (FDD) cell and a time division duplex (TDD) cell and determines an uplink (UL)-downlink (DL) direction of the FDD cell according to a UL-DL configuration of the TDD cell.

7 Claims, 7 Drawing Sheets

(51) Int. Cl.
  *H04L 5/00*   (2006.01)
  *H04L 1/18*   (2006.01)
  *H04L 5/14*   (2006.01)
(52) U.S. Cl.
  CPC ............... *H04L 5/00* (2013.01); *H04L 5/001* (2013.01); *H04L 5/0055* (2013.01); *H04L 5/14* (2013.01); *H04L 5/0048* (2013.01)
(58) Field of Classification Search
  CPC ....... H04J 2011/0009; H04J 2011/0013; H04J 2011/0016; H04J 2011/002; H04J 3/1676; H04L 5/0007; H04L 27/32; H04L 27/34; H04L 25/4902; H04B 14/026
  USPC ................................... 370/203–208, 276–28
  See application file for complete search history.

(56)  References Cited

OTHER PUBLICATIONS

Iaesi, "Solutions for TDD-FDD joint operation in the same frequency band", R1-133764, 3GPP TSG-RAN WG1#74, Barcelona, Spain, Aug. 19-23, 2013, pp. 1-3, Figure 1. http://www.3gpp.org/ftp/tsg_ran/WG1_RL1/TSGR1_74/Docs/R1-133764.zip.

Samsung, "Solutions for FDD-TDD Joint Operation", R1-133102, 3GPP TSG RAN WG1 #74, Barcelona, Spain, Aug. 19-23, 2013, pp. 1-2. http://www.3gpp.org/ftp/tsg_ran/WG1_RL1/TSGR1_74/Docs/R1-13102.zip.

Sharp, "Deployment scenarios and requirements for TDD-FDD CA", R1-133232, 3GPP TSG RAN WG1 Meeting #74, Barcelona, Spain, Aug. 19-23, 2013, pp. 1-3, Figure 2. http://www.3gpp.org/ftp/tsg_ran/WG1_RL1/TSGR1_74/Docs/R1-133232.zip.

* cited by examiner

WIRELESS DEVICE FOR WHICH PLURALITY OF SERVING CELLS IS CONFIGURED, AND COMMUNICATION METHOD USING SAME

CROSS REFERENCE TO RELATED APPLICATIONS

This application is the National Phase of PCT International Application No. PCT/KR2014/007422, filed on Aug. 11, 2014, which claims priority under 35 U.S.C. 119(e) to U.S. Provisional Application No. 61/883,187, filed on Sep. 26, 2013 and 61/949,259 filed on Mar. 7, 2014, all of which are hereby expressly incorporated by reference into the present application.

BACKGROUND OF THE INVENTION

Field of the Invention

The present invention relates to wireless communications, and more particularly, to a wireless device for which a plurality of serving cells is configured, and a communication method using the same.

Related Art

Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

In a communication system, a duplex scheme includes a time division duplex (TDD) and a frequency division duplex (FDD). The TDD provides an uplink communication and a downlink communication in the same frequency band. The FDD provides the uplink communication and the downlink communication in different frequency bands.

A user equipment (UE) may be classified into a full-duplex UE and a half-duplex UE according to its capability. The full-duplex UE is a UE capable of simultaneously performing an uplink communication and a downlink communication. The half-duplex UE is a UE capable of performing only one of the uplink communication and the downlink communication at one time.

A carrier aggregation is a technique capable of providing a plurality of component carriers to the UE. Each component carrier may be defined as one cell. When the plurality of component carriers is configured for the UE, the UE may receive services from a plurality of serving cells.

Each serving cell may be configured with the FDD or the TDD. In a carrier aggregation environment, the UE may be configured with a plurality of duplex schemes. For example, if two cells are configured for the UE, the cells may be configured as a TDD cell-TDD cell or a TDD cell-FDD cell. Accordingly, a throughput of the UE may be increased in various network environments.

However, since a plurality of duplex schemes is applied to the UE, there may be a problem in an operation for the downlink communication and the uplink communication.

SUMMARY OF THE INVENTION

The present invention provides a wireless device for which a plurality of serving cells is configured, and a communication method using the same.

In an aspect, a communication method performed by a wireless device for which a plurality of serving cells is configured in a wireless communication system is provided. The method includes configuring a frequency division duplex (FDD) cell and a time division duplex (TDD) cell, and determining an uplink (UL)-downlink (DL) direction of the FDD cell according to a UL-DL configuration of the TDD cell.

In another aspect, a wireless device for which a plurality of serving cells is configured in a wireless communication system is provided. The wireless device includes a radio frequency (RF) unit configured to transmit and receive a radio signal and a processor operatively coupled to the RF unit and configured to configure a frequency division duplex (FDD) cell and a time division duplex (TDD) cell, and determine an uplink (UL)-downlink (DL) direction of the FDD cell according to a UL-DL configuration of the TDD cell.

When a plurality of serving cells is configured for a wireless device, a communication operation between the plurality of serving cells can be clarified.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) based on 3GPP TS release 8 or 3GPP LTE-advanced (LTE-A) based on 3GPP TS release 10. This is for exemplary purposes only, and the present invention is also applicable to various wireless communication systems. In the following description, LTE and/or LTE-A are collectively referred to as LTE.

A wireless device may be served by a plurality of serving cells. Each serving cell may be defined by a downlink (DL) component carrier (CC) or a pair of a DL CC and an uplink (UL) CC.

A serving cell may be classified into a primary cell and a secondary cell. The primary cell operates at a primary frequency, performs an initial connection establishment procedure, initiates a connection reestablishment procedure or is designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by a upper layer signaling (e.g. RRC message).

A cell index (CI) of the primary cell may be fixed. For example, lowest CI may be set as the CI of the primary cell. Hereinafter, the CI of the primary cell is set to zero and the CI of a secondary cell may be assigned subsequently starting from one.

Figure 1:
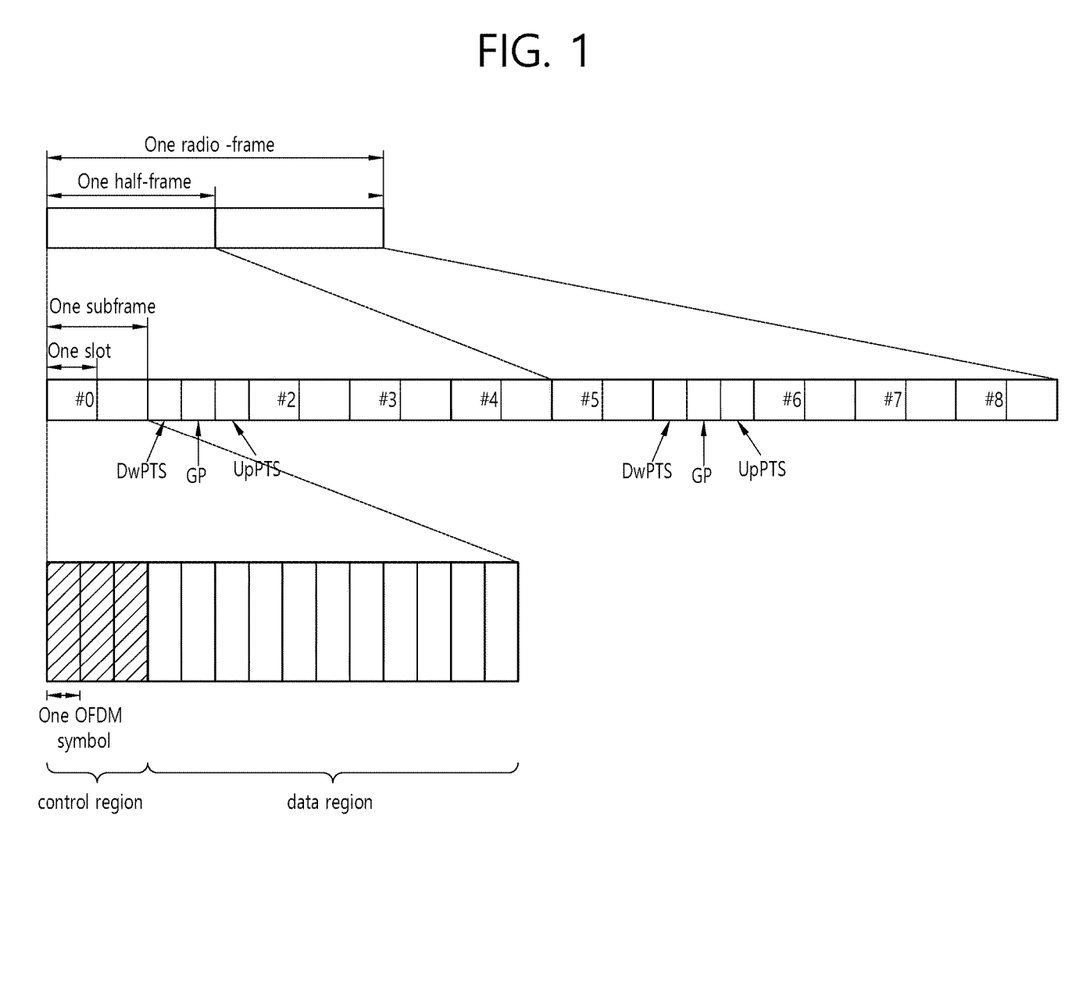
FIG. 1 shows a structure of a downlink (DL) radio frame in $3^{rd}$ generation partnership project (3GPP) long term evolution-advanced (LTE-A).

FIG. 1 shows a structure of a downlink radio frame in 3GPP LTE-A. The section 4 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

Subframes having ubdexes #1 and #6 are called as special (S) subframes. A S subframe may include a downlink pilot time slot (DwPTS), a guard period (GP) and a uplink pilot time slot (UpPTS). The DwPTs may be used for initial cell search, synchronization and channel estimation. The UpPTS may be used for channel estimation at a BS, uplink synchronization at a wireless device. The GP, also called as a gap, may be a duration to mitigate uplink interference due to multi-path delay of a downlink signal between downlink and uplink.

In TDD, a subframe may be a DL subframe or a UL subframe. Table 1 shows an example of radio frame configuration.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe and 'S' denotes a S subframe. When a UL-DL configuration is received from a BS, a wireless device can know which subframe is a DL subframe or a DL subframe in accordance with the UL-DL configuration.

A DL subframe is divided into a control region and a data region in the time domain. The control region includes up to first three OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

DL control channels are described as follows.

As disclosed in 3GPP TS 36.211 V10.2.0, the 3GPP LTE/LTE-A classifies a physical control channel into a physical downlink control channel (PDCCH), a physical control format indicator channel (PCFICH) and a physical hybrid-ARQ indicator channel (PHICH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

To reduce a burden due to a blind decoding, 3GPP LTE uses a search space. The search space may be a CCE monitoring set for the PDCCH. A wireless device can monitor a PDCCH in the search space.

The search space can be classified into a common search space (CSS) and a UE-specific search space (USS). The CSS is used to search a PDCCH having common control information. The CSS may include 16 CCEs having indexes from 0 to 15 and may support a PDCCH having CCE aggregation levels {4, 8}. In CSS, a PDDCH having UE-specific control information may be monitored. The USS supports a PDCCH having CCE aggregation levels {1, 24, 8}.

In 3GPP LTE, uplink channels include a physical uplink control channel (PUCCH) and a physical uplink shared channel (PUSCH).

Now, HARQ performed in 3GPP LTE is described.

In FDD, timing for ACK/NACK transmission for DL data is predetermined. Upon receiving the DL data in a subframe n, a wireless device transmits ACK/NACK through a PUCCH in a subframe n+4.

Unlike the FDD, DL subframes and UL subframes coexist in TDD. Generally, the number of the UL subframes is less than the number of DL subframes. Accordingly, in preparation for a case where UL subframes are insufficient to transmit an ACK/NACK signal, it is supported to transmit a plurality of ACK/NACK signals in one UL subframe with respect to a plurality of DL transport blocks.

The following table shows a DL subframe n-k associated with a UL subframe n according to a UL-DL configuration in 3GPP LTE TDD. Herein, k∈K, and M represents the number of elements of a set K.

Assume that the TDD cell and the FDD cell are configured for the half-duplex device. There may be a subframe in which operations overlap between DL reception in the TDD cell and UL transmission in the FDD cell or UL transmission in the TDD cell and DL reception in the FDD cell.

Figure 2:
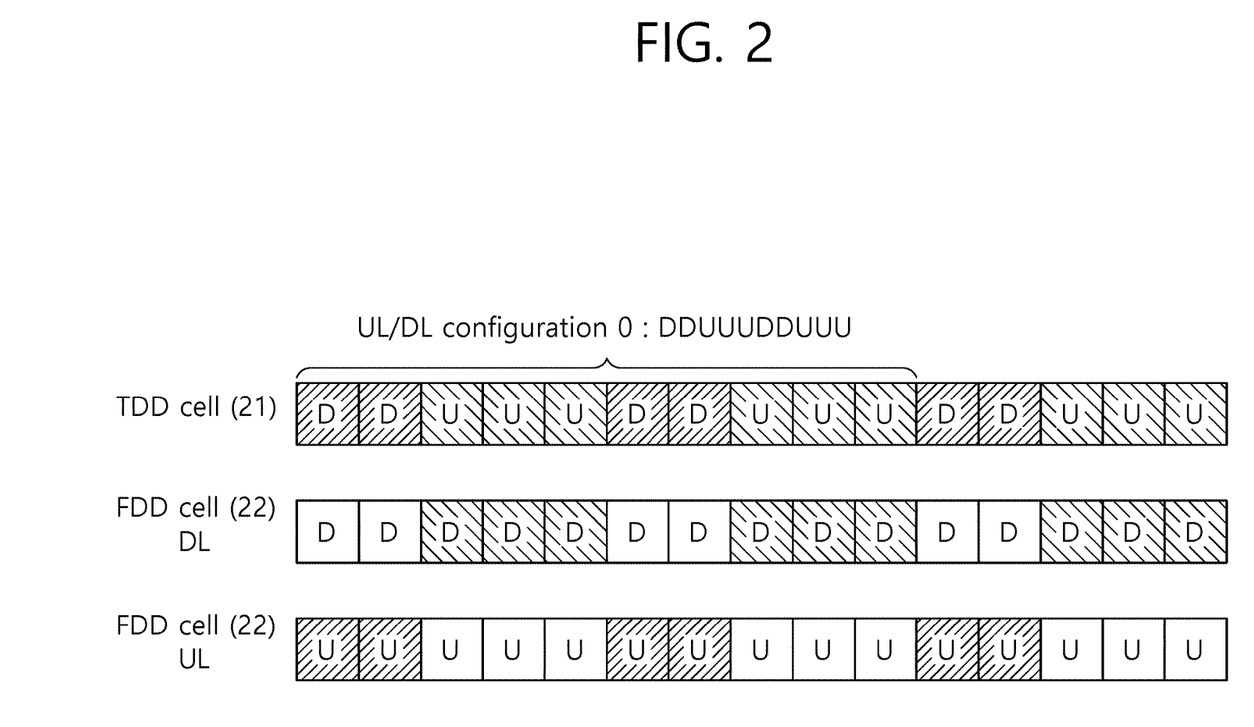
FIG. 2 shows a problem when time division duplex (TDD)-frequency division duplex (FDD) carrier aggregation (CA) is applied.

FIG. 2 shows a problem when TDD-FDD CA is applied.

A TDD cell 21 and FDD cell 22 which are set to a UL/DL configuration 0 are configured for a wireless device. In one radio frame, 4 TDD DL subframes of the TDD cell 21 collide with a UL subframe of the FDD cell 22. Further, 6 TDD UL subframes of the TDD cell 21 collide with a DL subframe of the FDD cell 22.

Herein, the collision means a case where DL reception in the TDD cell overlaps with UL transmission in the FDD cell, or UL transmission in the TDD cell overlaps with DL reception in the FDD cell. At the occurrence of a DL-UL collision, there is an ambiguity as to which operation will be performed between UL transmission and DL reception by a half-duplex device in a corresponding subframe.

A method for performing a TDD-FDD CA operation while avoiding a DL-UL collision is proposed.

Although it is assumed hereinafter that an FDD cell is a primary cell and a TDD cell is a secondary cell, the present invention is not limited thereto. Further, although it is exemplified that one FDD cell and one TDD cell are configured for a wireless device, it is also possible that a plurality of FDD cell and a plurality of TDD cells are configured. Although it is exemplified that the TDD cell is set to a UL-DL configuration 0 of Table 1, this is for exemplary purposes only.

The wireless device may be a half-duplex device or a full-duplex device.

<Method 1>

Figure 3:
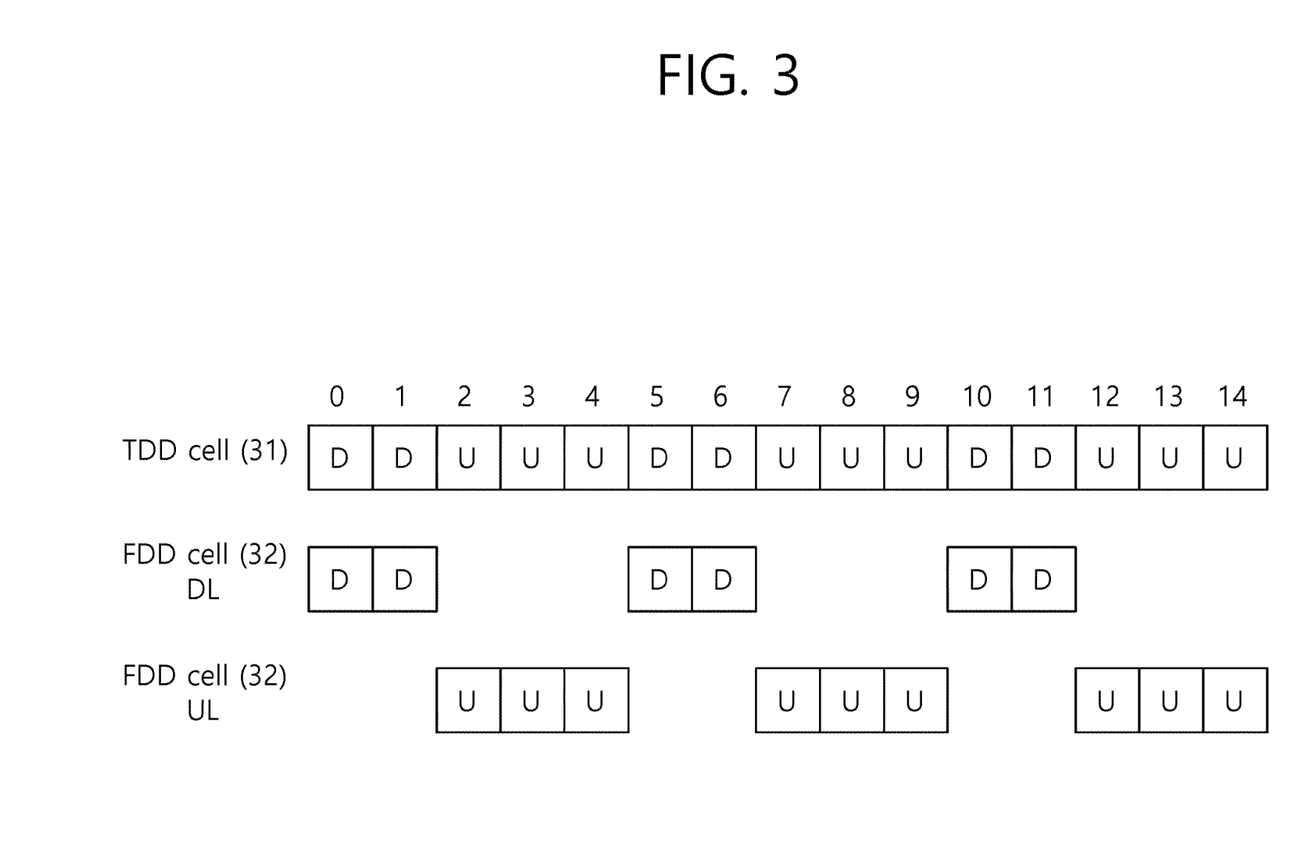
FIG. 3 shows an uplink (UL)-DL communication according to an exemplary embodiment of the present invention.

FIG. 3 shows a UL-DL communication according to an exemplary embodiment of the present invention.

A wireless device may operate in an FDD cell 32 according to an operation of a TDD cell 31. The wireless device performs DL reception only in a subframe corresponding to

TABLE 2

| UL-DL configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Now, an embodiment of the proposed present invention is described.

Under a network environment in which carrier aggregation (CA) is supported, a wireless device may be configured not only for a time division duplex (TDD) cell-TDD cell or a frequency division duplex (FDD) cell-FDD cell but also for a TDD cell-FDD cell. The TDD cell is a cell for which TDD is configured, and the FDD cell is a cell for which FDD is configured. For convenience, applying of a plurality of duplex schemes to the wireless device is called TDD-FDD CA. This may significantly increase a DL/UL peak throughput.

TDD-FDD CA may be applied not only to a full-duplex device capable of simultaneously performing DL reception and UL transmission but also to a half-duplex device.

a TDD DL subframe in a DL carrier of in the FDD cell 32. In addition, the wireless device performs UL transmission in a subframe corresponding to a TDD UL subframe in a UL carrier of the FDD cell 32.

A half-duplex device may enable limited DL reception and UL transmission in the FDD cell 32 while a DL/UL transmission/reception operation remains intact in the existing TDD cell 31.

If a full-duplex device cannot simultaneously perform DL reception in a DL carrier of an FDD cell and UL transmission in a UL carrier of a TDD cell due to a problem of a frequency separation of an FDD carrier and a TDD carrier, the full-duplex device may conform to the aforementioned operation only for the DL carrier of the FDD cell. If the full-duplex device cannot simultaneously perform UL transmission in a UL carrier of the FDD cell and DL reception in a DL carrier of the TDD cell due to the problem of the frequency separation of the FDD carrier and the TDD carrier, the full-duplex device may conform to the aforementioned operation only for the UL carrier of the FDD cell.

Meanwhile, HARQ timing needs to be newly defined in the aforementioned operation. The HARQ timing may include at least one of HARQ ACK/NACK transmission timing for DL data, scheduling timing for UL data, and HARQ ACK/NACK reception timing and retransmission timing on a PHICH.

In a first embodiment, the wireless device may conform to the HARQ timing of the FDD cell and the HARQ timing of the TDD cell.

A DL/UL subframe of the FDD cell which does not collide with a UL/DL subframe of the TDD cell may operate according to the existing HARQ timing (e.g., Table 2) defined based on a UL-DL configuration of the TDD cell.

However, if the FDD cell is a primary cell, there may be a problem in that HARQ timing of the primary cell is changed according to whether the TDD cell which is a secondary cell is configured for the wireless device. The HARQ timing of the primary cell may become ambiguous during the secondary cell is configured, and thus an error may occur in data transmission and data reception of the primary cell.

The existing FDD HARQ timing may be maintained for DL data scheduled by a common search space (CSS) of the FDD cell. Even if the TDD cell is configured, the wireless device may transmit HARQ ACK/NACK for DL data received through a PDCCH monitored in the CSS according to the FDD timing. A BS may schedule data transmission/reception required during TDD secondary cell configuration or reconfiguration in the CSS, thereby avoiding an ambiguity.

In a second embodiment, the wireless device may maintain the HARQ timing of the FDD cell even if the TDD cell is configured.

A UL subframe for transmitting UL ACK/NACK may be invalid as to DL data received in a specific DL subframe of the FDD cell, or a DL subframe for receiving DL ACK/NACK may be invalid as to UL data transmitted in a specific UL subframe. In this case, the following operation is possible.

Figure 4:
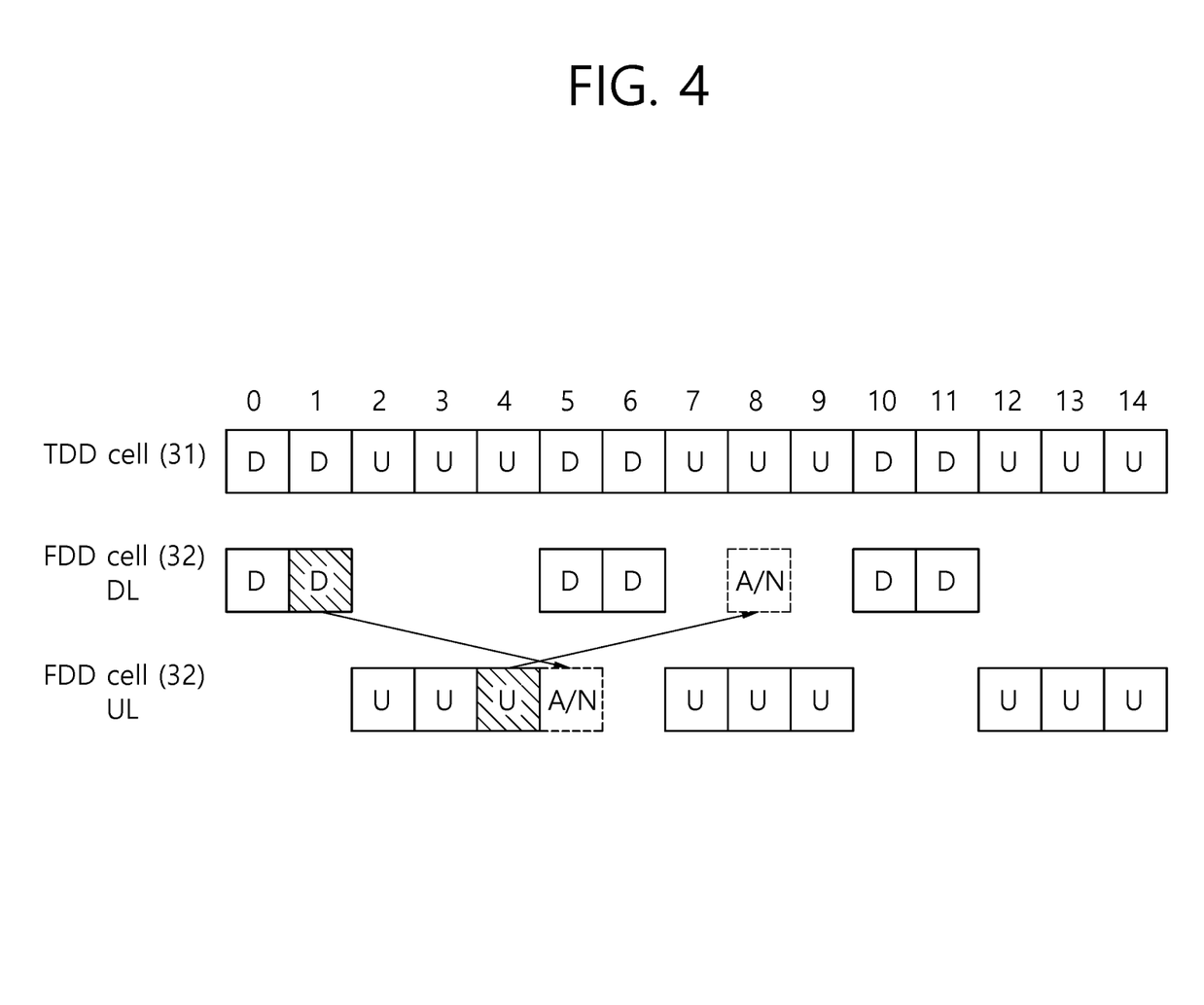
FIG. 4 shows an example of a hybrid automatic repeat request (HARQ) operation according to an embodiment of the present invention.

FIG. 4 shows an example of an HARQ operation according to an embodiment of the present invention. In the figure, ACK/NACK is simply abbreviated as 'A/N'.

DL data may not be received as to a DL subframe in which a UL subframe for ACK/NACK transmission is invalid. Alternatively, UL data may not be transmitted as to a UL subframe in which a DL subframe for ACK/NACK reception is invalid. 'DL data' or 'UL data' may be limited to data for which ACK/NACK feedback is required.

According to FDD HARQ timing, ACK/NACK is transmitted in a subframe 5 as to PDSCH reception at a subframe 1 of the FDD cell 32. However, since the subframe 5 is set to a DL direction in the TDD cell 31, the subframe 5 is invalid as to ACK/NACK transmission for the subframe 1. Therefore, a BS does not schedule a PDSCH for a wireless device in the subframe 1, and the wireless device does not expect PDSCH reception in the subframe 1. The wireless device may not monitor a PDCCH for the wireless device in the subframe 1.

When conforming to the FDD HARQ timing, ACK/NACK for a PUSCH transmitted on a UL subframe 4 of the FDD cell 32 is received in a DL subframe 8. However, the subframe 8 is invalid for ACK/NACK reception since it is set to a UL direction in the TDD cell 31. Therefore, the BS does not schedule a PUSCH for the wireless device in the subframe 8, and does not expect that the PUSCH is scheduled in the subframe 8. If the PUSCH is scheduled in the subframe 8, the wireless device may discard PUSCH transmission.

Figure 5:
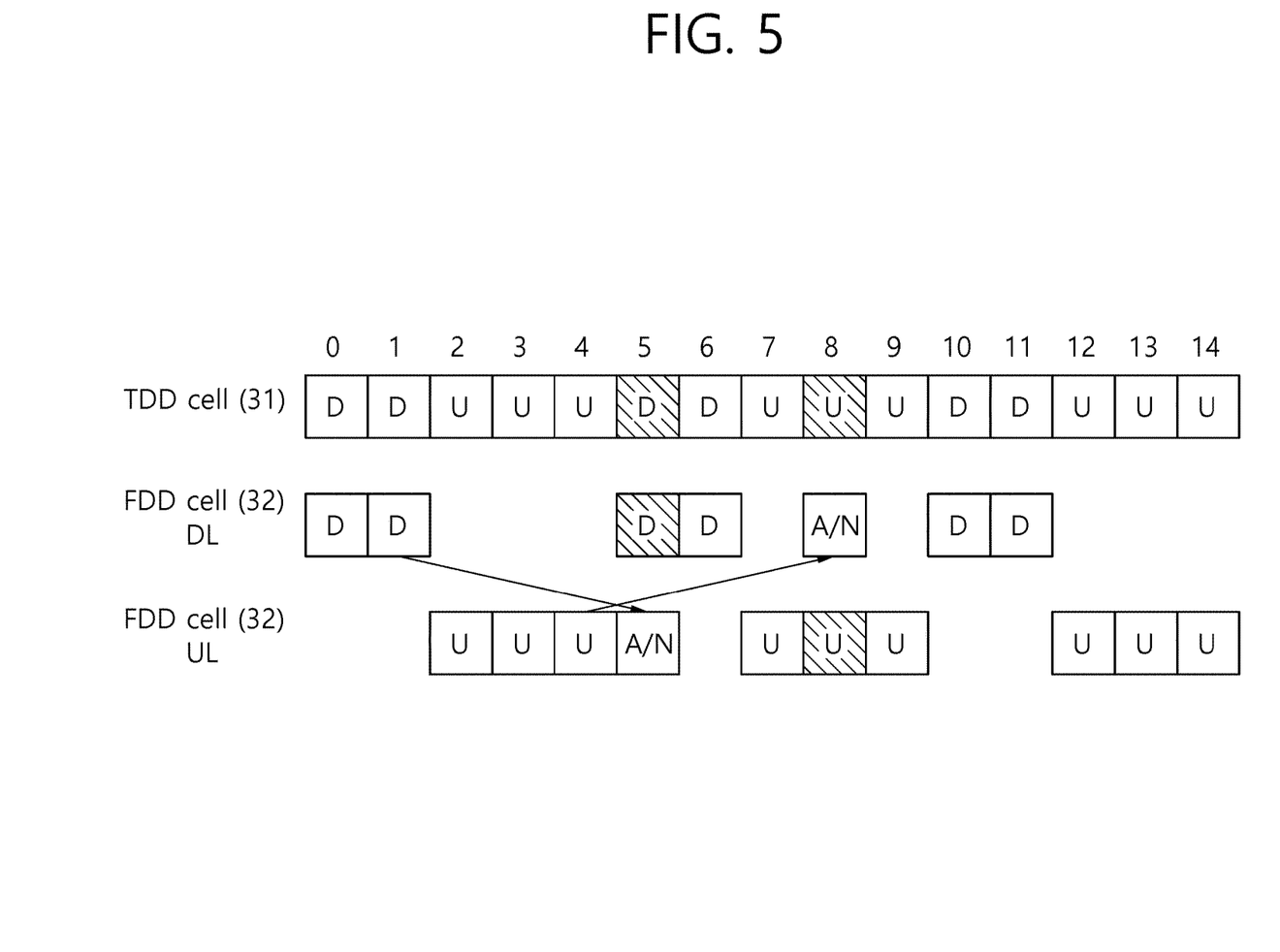
FIG. 5 shows another example of an HARQ operation according to an embodiment of the present invention.

FIG. 5 shows another example of an HARQ operation according to an embodiment of the present invention.

In a subframe for receiving ACK/NACK for UL data transmitted according to a UL subframe configured in an FDD cell 32, the ACK/NACK may be received while overriding a UL/DL direction of a TDD cell 31. Alternatively, in a subframe for transmitting ACK/NACK for DL data received according to a DL subframe configured in the FDD cell 32, the ACK/NACK may be transmitted while overriding the UL/DL direction of the TDD cell 31. In a subframe for receiving or transmitting ACK/NACK, in addition to the ACK/NACK, other traffic or control signals may be received or transmitted.

In a subframe 5 of the FDD cell 32, a UL operation cannot be performed in principle according to a TDD UL/DL direction. However, in order to transmit ACK/NACK for DL data received in a subframe 1 of the FDD cell 32, the wireless device performs UL transmission in the subframe 5. In this case, DL reception may not be performed in the subframe 5 of the TDD cell 31 and the FDD cell 32.

A DL operation cannot be performed in principle in a subframe 8 of the FDD cell 32. However, in order to receive ACK/NACK for a PUSCH transmitted in a subframe 4 of the FDD cell, the wireless device performs DL reception in the subframe 8. In this case, UL reception may not be performed in the subframe 8 of the TDD cell 31 and the FDD cell 32.

<Method 2>

A UL-DL direction of an FDD cell may be designated by a BS. Information regarding the UL-DL direction may be reported by the BS to a wireless device via an RRC message.

In a DL/UL subframe of a TDD cell colliding with the UL/DL direction of the FDD cell, data reception/transmission of the TDD cell may be prohibited.

If a full-duplex device cannot simultaneously perform DL reception in a DL carrier of the FDD cell and UL transmission in a UL carrier of the TDD cell due to a problem of a frequency separation of the FDD carrier and the TDD carrier, the full-duplex device may conform to the aforementioned operation only as to a DL carrier of the FDD cell. If the full-duplex device cannot simultaneously perform UL transmission in a UL carrier of the FDD cell and DL reception in a DL carrier of the TDD cell due to the problem of the frequency separation of the FDD carrier and the TDD carrier, the full-duplex device may conform to the aforementioned operation only as to the UL carrier of the FDD cell.

As described in the aforementioned method 1, data reception may be prohibited in an invalid subframe corresponding to a subframe for transmitting ACK/NACK in the FDD cell. Alternatively, data transmission may be prohibited in an invalid subframe corresponding to a subframe for receiving ACK/NACK in the FDD cell.

Alternatively, in a subframe for receiving ACK/NACK, ACK/NACK in the FDD cell may be received even if the TDD cell is set to a UL direction. In a subframe for transmitting ACK/NACK, ACK/NACK in the FDD cell may be transmitted even if the TDD cell is set to a DL direction. In this case, a UL/DL operation of the TDD cell may not be performed as to a subframe in which the UL/DL directions of the TDD cell override.

<Method 3>

Whether a UL/DL operation of a TDD cell is allowed may be determined according to a DL/UL direction in an FDD cell.

The UL/DL direction in the FDD cell may be predetermined. Alternatively, the UL/DL direction may be determined according to transmission/reception in an FDD primary cell. For example, if UL transmission is preconfigured or scheduled in any subframe of the FDD cell, a wireless device in the any subframe may perform a UL transmission operation instead of performing a DL reception operation. An example in which the UL transmission is preconfigured includes periodic PUCCH transmission and periodic SRS transmission. An example in which the UL transmission is scheduled includes PUSCH transmission, random access preamble transmission, non-periodic SRS transmission, and ACK/NACK transmission for PDCCH/PDSCH.

According to an arrangement between an FDD DL carrier band and a TDD carrier band and a transmission/reception structure of the wireless device, the wireless device may not be able to simultaneously perform reception in the FDD DL carrier and UL transmission in the TDD carrier. The wireless device may perform the UL transmission in the TDD carrier only as to a subframe in which UL transmission is preconfigured or scheduled for the FDD carrier. The wireless device may not perform UL transmission for the TDD cell as to a subframe in which UL transmission is not configured or is not scheduled in the FDD cell, and may not expect that the UL transmission is scheduled.

According to an arrangement between an FDD UL carrier band and a TDD carrier band and a transmission/reception structure of the wireless device, the wireless device may not be able to simultaneously perform transmission in the FDD UL carrier and DL reception in the TDD carrier. The wireless device may perform DL reception in the TDD carrier only as to a subframe in which UL transmission is not preconfigured or is not scheduled for the FDD carrier among DL subframes of the TDD carrier. The wireless device may not perform DL reception for the TDD cell as to a subframe in which UL transmission is configured or scheduled in the FDD cell.

<Method 4>

Whether a UL/DL operation in an FDD cell is allowed may be determined on the basis of transmission/reception in a TDD cell.

When DL reception in a TDD carrier and UL transmission in an FDD carrier cannot be performed simultaneously, a wireless device may perform the UL transmission in the FDD UL carrier only as to a subframe in which UL transmission is preconfigured or scheduled for the TDD carrier. As to a subframe in which UL transmission is not configured or is not scheduled in the TDD cell, the wireless device may not perform UL transmission preconfigured for the FDD cell or may not expect that UL transmission is scheduled. The wireless device may perform a DL reception operation in an FDD DL carrier also as to a UL transmission of the TDD cell.

When the UL transmission in the TDD carrier and the DL reception of the FDD DL carrier cannot be simultaneously performed, the wireless device may perform the DL reception in the FDD DL carrier only as to a subframe in which UL transmission is not preconfigured or is not scheduled for the TDD carrier. The wireless device may not perform the DL reception in the FDD cell as to a subframe in which UL transmission is configured or scheduled in the TDD cell. In the FDD cell, this operation may also be applied only to a half-duplex device but also to a full-duplex device.

Assume that the TDD cell is a primary cell, and the FDD cell is a secondary cell. When UL transmission in the TDD carrier and DL reception in the FDD DL carrier cannot be performed simultaneously, the wireless device may perform the DL reception in the FDD DL carrier only as to a subframe in which UL transmission is not preconfigured or is not scheduled in the TDD carrier or the FDD UL carrier. The wireless device may perform DL reception in the FDD cell also as to a subframe designated as a UL subframe in a TDD primary cell.

<Method 5>

A subframe in which a DL common signal is transmitted may be designated as a DL subframe.

Assume that an FDD cell is a primary cell in the determining of the UL/DL direction described in the aforementioned methods 1 to 4. A subframe used in reception of a DL common signal (e.g., a PBCH, a synchronization signal, etc.) which is important in an FDD cell may be designated as a DL subframe.

Figure 6:
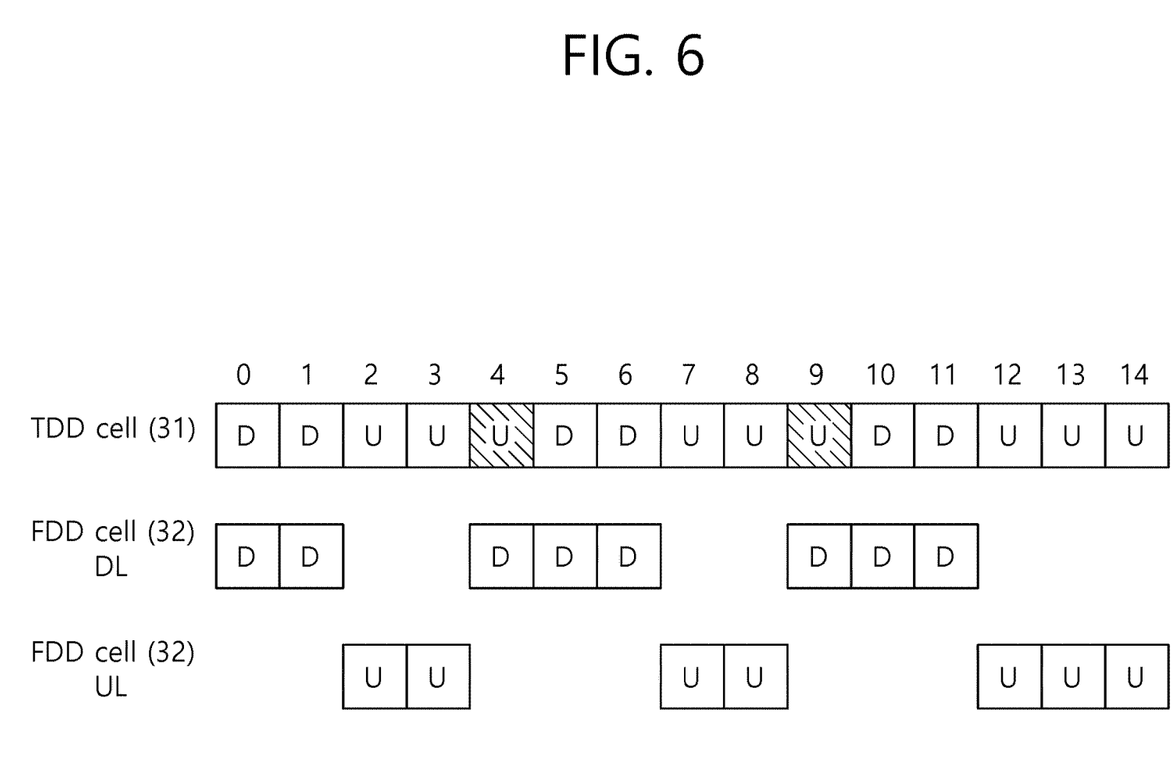
FIG. 6 shows a subframe structure according to an embodiment of the present invention.

FIG. 6 shows a subframe structure according to an embodiment of the present invention.

Subframes 4 and 9 of a TDD cell are pre-designated as UL subframes. However, subframes 4 and 9 of an FDD cell are DL subframes in which a PBCH is transmitted. Therefore, the subframes 4 and 9 of the TDD cell may prohibit a UL operation, or may be re-defined as DL subframes.

Hereinafter, it is proposed a solution in a specific situation in which a DL/UL collision occurs in a system to which at least any one of the methods 1 to 5 is applied.

First, if reception of DL ACK/NACK collides with UL PUSCH/SRS/CSI transmission in one subframe, the PUSCH/SRS/CSI transmission may be discarded since ACK/NACK feedback for previously transmitted PUSCH data is important. If reception of a retransmission grant collides with UL PUSCH/SRS/CSI transmission in one subframe, PUSCH/SRS/CSI transmission may be discarded to perform HARQ. As to a corresponding PUSCH, PUSCH scheduling may not be expected, and corresponding PDCCH decoding may not be performed.

Second, if UL ACK/NACK transmission collides with DL PDSCH reception in one subframe, PDSCH reception (or PDCCH decoding for scheduling a PDSCH) may be discarded since ACK/NACK feedback for a previously received PDSCH is important.

Third, a wireless device may assign a higher priority to a random access procedure. The wireless device may discard DL reception colliding with UL PRACH transmission in one subframe. The wireless device may discard UL transmission colliding with reception of a random access response in one subframe. The wireless device may discard DL transmission colliding with transmission of a response for a random access response in one subframe.

The aforementioned methods may be applied to a half-duplex device in which a DL-UL collision is possible not only in TDD-FDD CA but also between a TDD cell and an FDD cell.

If the wireless device cannot simultaneously perform reception of a special subframe of a TDD cell and FDD UL transmission, a DL signal such as PDCCH, PDSCH, EPDCCH, PMCH, and PRS cannot be received in a DwPTS duration of the TDD cell. However, the wireless device may transmit a signal such as SRS and PRACH in an UpPTS duration of the TDD cell. Optionally, if there is no UL transmission preconfigured or scheduled in an FDD UL carrier, DL reception in the DwPTS duration and UL transmission in the UpPTS duration may be both allowed.

According to the aforementioned methods 1 and 2, there may be a case where DL PDSCH reception is discarded in a subframe n-4 when a subframe n is not set to a UL subframe and thus ACK/NACK cannot be transmitted. In the subframe n-4, the wireless device may perform reception on a PDCCH order for ordering PRACH transmission or a DL signal, such as paging, which does not require ACK/NACK transmission. This may also be applied not only to a half-duplex device but also to a full-duplex device.

Figure 7:
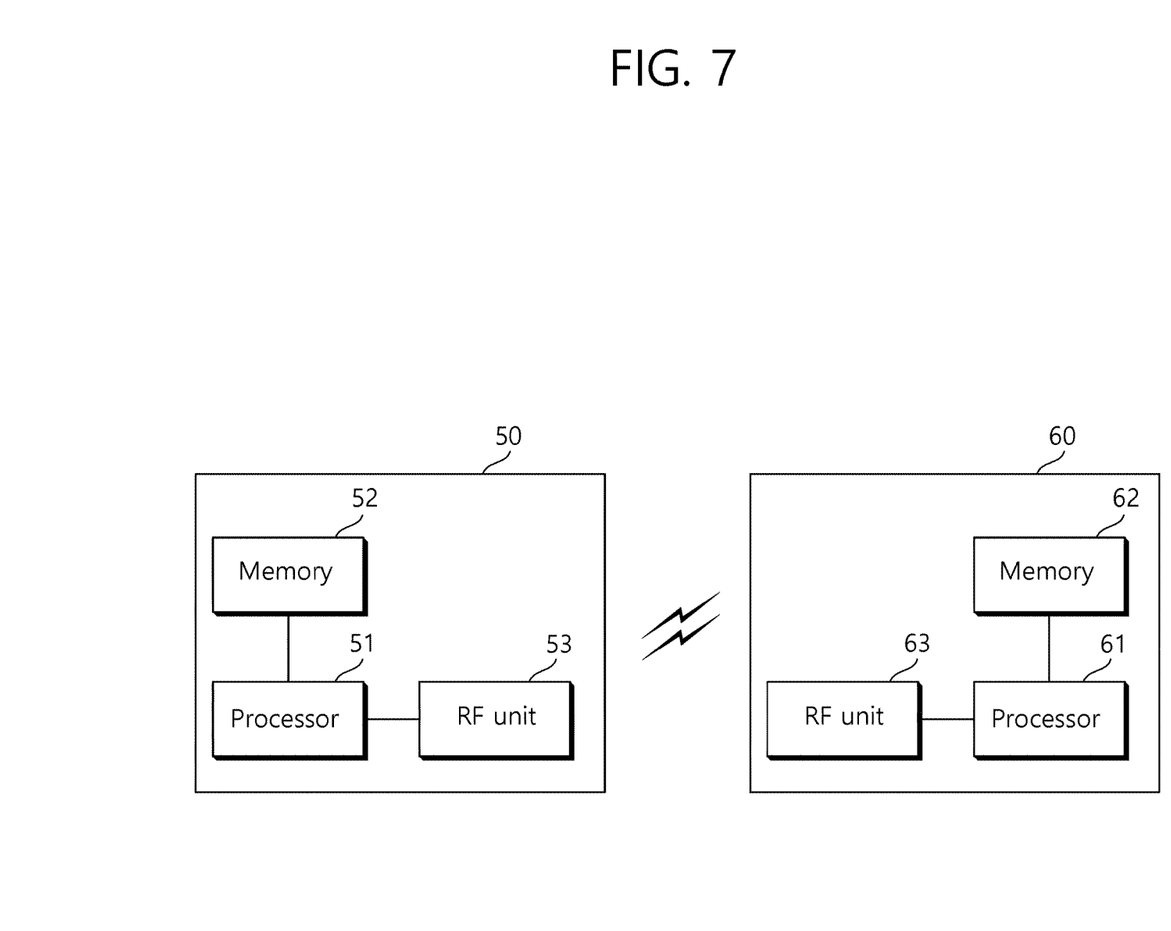
FIG. 7 is a block diagram showing a wireless communication system according to an embodiment of the present invention.

FIG. 7 is a block diagram showing a wireless communication system according to an embodiment of the present invention.

A BS 50 includes a processor 51, a memory 52, and a radio frequency (RF) unit 53. The memory 52 is coupled to the processor 51 to store a variety of information for driving the processor 51. The RF unit 53 is coupled to the processor 51 to transmit and/or receive a radio signal. The processor 51 implements the proposed functions, procedures, and/or methods. In the aforementioned embodiment, an operation of the BS may be implemented by the processor 51.

A wireless device 60 includes a processor 61, a memory 62, and an RF unit 63. The wireless device 60 may be a half-duplex device or a full-duplex device. The memory 62 is coupled to the processor 61 to store a variety of information for driving the processor 61. The RF unit 63 is coupled to the processor 61 to transmit and/or receive a radio signal. The processor 61 implements the proposed functions, procedures, and/or methods. In the aforementioned embodiment, an operation of the wireless device may be implemented by the processor 61. A plurality of cells may be configured for the wireless device 60, and a UL/DL direction for each cell may be determined according to at least one of the aforementioned methods 1 to 5.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of communicating in a wireless communication system, the method performed by a wireless device served by a plurality of serving cells, the method comprising:

configuring a frequency division duplex (FDD) cell and a time division duplex (TDD) cell as the plurality of serving cells, wherein the FDD cell is a primary cell, wherein the TDD cell is a secondary cell, wherein a downlink (DL) FDD radio frame of the FDD cell includes a plurality of first FDD subframes, wherein each of the first FDD subframes corresponds to a DL subframe, wherein an uplink (UL) FDD radio frame of the FDD cell includes a plurality of second FDD subframes, wherein each of the second FDD subframes corresponds to a UL subframe, wherein a TDD radio frame of the TDD cell includes a plurality of TDD subframes, and wherein each of the plurality of TDD subframes corresponds to the DL subframe or the UL subframe;

determining a DL subframe set that is capable of a DL reception among the plurality of first FDD subframes and a UL subframe set that is capable of a UL transmission among the plurality of second FDD subframes according to a predetermined UL-DL configuration of the TDD cell;

when the DL reception is performed in a first FDD subframe m, even if a TDD subframe m+k, where m and k are integers and k>1, corresponds to the DL subframe, transmitting an acknowledgment (ACK)/non-acknowledgement (NACK) in a second FDD subframe m+k according to a predetermined hybrid automatic repeat request (HARQ) timing of the FDD cell; and when the UL transmission is performed in a second FDD subframe n, even if a TDD subframe n+k, where n is an integer, corresponds to the UL subframe, receiving an ACK/NACK in a first FDD subframe n+k according to the predetermined HARQ timing of the FDD cell.

2. The method of claim 1, wherein the first FDD subframe m is a subframe among the plurality of first FDD subframes, wherein the TDD subframe m+k is a subframe among the plurality of TDD subframes, wherein the second FDD subframe m+k is a subframe among the plurality of second FDD subframes, wherein the second FDD subframe n is a subframe among the plurality of second FDD subframes, wherein the TDD subframe n+k is a subframe among the plurality of TDD subframes, and wherein the first FDD subframe n+k is a subframe among the plurality of first FDD subframes.

3. The method of claim 1, wherein the predetermined HARQ timing of the FDD cell conforms to a HARQ timing of the TDD cell.

4. The method of claim 1, wherein the wireless device does not perform DL reception in the subframe n+k of the TDD cell.

5. A wireless device for communicating in a wireless communication system, the wireless device served by a plurality of serving cells, the wireless device comprising:

a transceiver configured to transmit and receive a radio signal; and a processor operatively coupled to the transceiver and configured to:

configure a frequency division duplex (FDD) cell and a time division duplex (TDD) cell as the plurality of serving cells, wherein the FDD cell is a primary cell, wherein the TDD cell is a secondary cell, wherein a downlink (DL) FDD radio frame of the FDD cell includes a plurality of first FDD subframes, wherein each of the first FDD subframes corresponds to a DL subframe, wherein an uplink (UL) FDD radio frame of the FDD cell includes a plurality of second FDD subframes, wherein each of the second FDD subframes corresponds to a UL subframe, wherein a TDD radio frame of the TDD cell includes a plurality of TDD subframes, and wherein each of the plurality of TDD subframes corresponds to the DL subframe or the UL subframe, determine a DL subframe set that is capable of a DL reception among the plurality of first FDD subframes and a UL subframe set that is capable of a UL transmission among the plurality of second FDD subframes according to a predetermined UL-DL configuration of the TDD cell, when the DL reception is performed in a first FDD subframe m, even if a TDD subframe m+k, where m and k are integers and k>1, corresponds to the DL subframe, transmit an acknowledgment (ACK)/non-acknowledgement (NACK) in a second FDD subframe m+k according to a predetermined hybrid automatic repeat request (HARQ) timing of the FDD cell, and when the UL transmission is performed in a second FDD subframe n, even if a TDD subframe n+k, where n is an integer, corresponds to the UL subframe, receive an ACK/NACK in a first FDD subframe n+k according to the predetermined HARQ timing of the FDD cell.

6. The wireless device of claim 5, wherein the first FDD subframe m is a subframe among the plurality of first FDD subframes, wherein the TDD subframe m+k is a subframe among the plurality of TDD subframes, wherein the second FDD subframe m+k is a subframe among the plurality of second FDD subframes, wherein the second FDD subframe n is a subframe among the plurality of second FDD subframes, wherein the TDD subframe n+k is a subframe among the plurality of TDD subframes, and wherein the first FDD subframe n+k is a subframe among the plurality of first FDD subframes.

7. The wireless device of claim 5, wherein the predetermined HARQ timing of the FDD cell conforms to a HARQ timing of the TDD cell.

* * * * *